United States Patent [19]

Winings

[11] 3,967,738

[45] July 6, 1976

[54] PANEL BOARD LIFT

[76] Inventor: LeRoy Winings, 208 E. Third St., Harristown, Ill. 62537

[22] Filed: Jan. 6, 1975

[21] Appl. No.: 538,963

[52] U.S. Cl. .................................. 214/1 S; 254/103

[51] Int. Cl.$^{2}$ .......................... B66F 3/18; B25J 3/00

[58] Field of Search ........... 214/1 SW; 254/103, 104

[56] References Cited

UNITED STATES PATENTS

| | | | |
|---|---|---|---|
| 2,966,993 | 3/1959 | Cooper | 214/1 SW |
| 3,365,080 | 1/1968 | Crull | 214/1 SW |
| 3,438,514 | 4/1969 | Bose | 214/1 SW |

*Primary Examiner*—Philip Goodman
*Attorney, Agent, or Firm*—Wegner, Stellman, McCord, Wiles & Wood

[57] ABSTRACT

A wallboard or panel lift apparatus has a pressure switch positioned on the panel support rack such that excess lifting force will automatically cut off the motor driving the hydraulic lift. The apparatus has a foldable support rack and collapsible wheel-mounting arrangement which simplifies moving from one location to another and requires less space for storage.

8 Claims, 7 Drawing Figures

PANEL BOARD LIFT

BACKGROUND OF THE INVENTION

1. Field of the Invention

This invention relates to an apparatus for lifting wallboard or panelling and, more particularly, to such an apparatus for safely positioning said wallboard or panelling ready for securing to a building frame.

2. Description of the Prior Art

There are currently available, different forms of building panel lifts which are intended to assist the builder in raising wallboard or panelling into position on a ceiling or on a wall of a building under construction or under repair. These current devices suffer from various deficiencies that have limited their use and acceptance by all but a relatively few large, well-financed contractors.

One of the deficiences of the prior art devices is their bulk and size, both during use and for storage purposes. That is, the leg portions extend relatively far out from the center portion of the construction and create a source for tripping by the workmen. For storage, there is no means for reducing the size or bulk of the apparatus and, accordingly, a large space must be provided for storage purposes. Due to the large size, it is difficult to pass the equipment through doors and it is difficult to transport the equipment from one location to another.

In addition, many of the prior art devices are hand-driven for raising and lowering the lift or are inefficiently power driven so as to render the devices substantially useless except for relatively light loads which could easily be handled by the individuals involved without the need for the special lift equipment.

In addition, current devices also suffer from the deficiency that there is no way to warn or advise the operator that the panel is against the ceiling and, accordingly, it is not uncommon for the lift to override the proper height thereby cracking or puncturing the board or panel.

SUMMARY OF THE INVENTION

A lift device is provided which is relatively compact both during use and during storage. The lift is built around a base plate with legs which are foldable to a collapsed position for transport and storage.

A telescopic pillar is provided which is hydraulically driven by means of a pump and motor which are actuated by a hand-operated control valve.

The support rack at the top of the telescopic pillar is provided with rollers making it possible to freely roll the panel relative to the support rack and the support rack is provided with sleeves and pivots which make it possible to collapse the support rack into a relatively small, flat stack approximating about one-quarter of the size of the extended support rack. A pressure-control switch is provided on the support rack which is adapted to bear against the panel being lifted so that in the event excessive force is applied to the panel, the panel will deflect and trip the control switch which will deactivate the motor and pump before damage can be done to the panel.

Due to the construction and operation of the lift, it is relatively inexpensive to construct and to maintain and, since the rack, pillar and carrying mechanisms can be collapsed, the lift can be easily moved from room-to-room and can be stored in a limited amount of space.

BRIEF DESCRIPTION OF THE DRAWINGS

The details of construction and operation of the invention are more fully described with reference to the accompanying drawings which form a part hereof and in which like reference numerals refer to like parts throughout.

In the drawings.

DESCRIPTION OF THE PREFERRED EMBODIMENT

Figure 3:
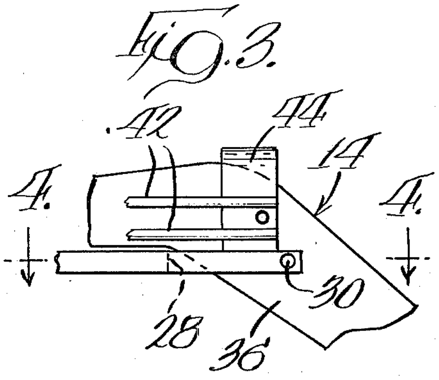
FIG. 3 is an enlarged, broken away elevational view of the connection between a leg and the base of the mechanism with the leg in the extended position.
Figure 1:
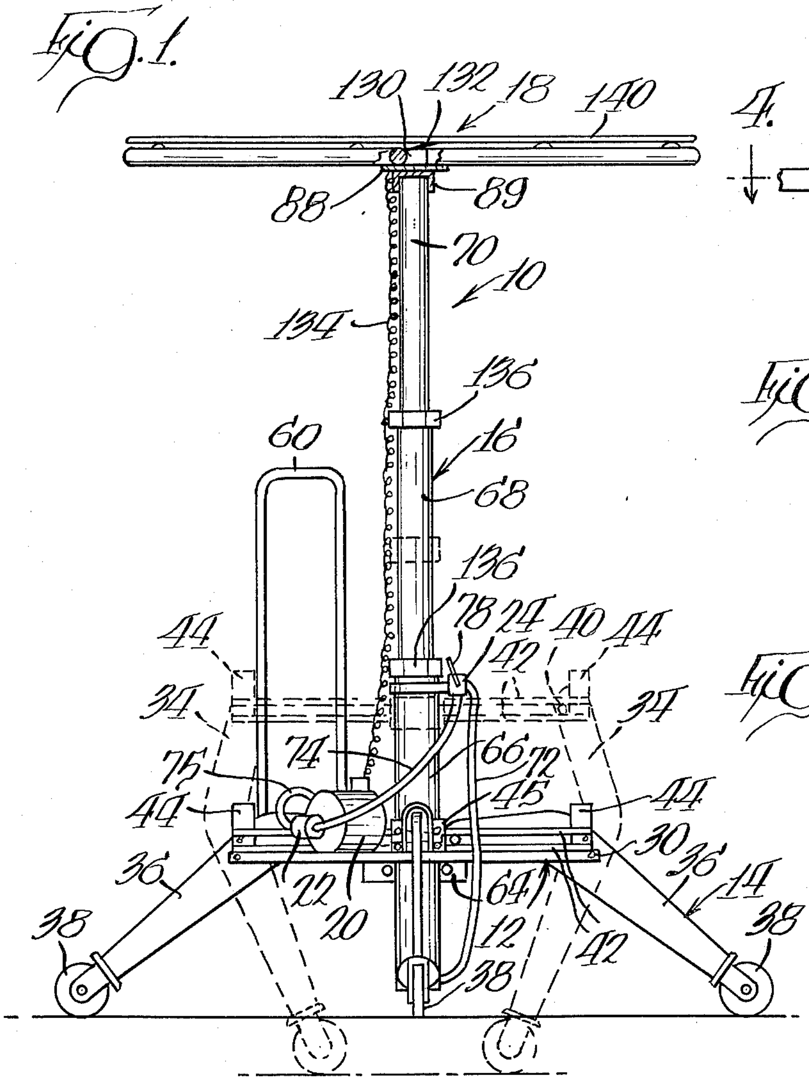
FIG. 1 is an elevational view of the front of my hydraulic lift with the support legs shown both in solid lines for lifting and in phantom for transporting and storage.
Figure 2:
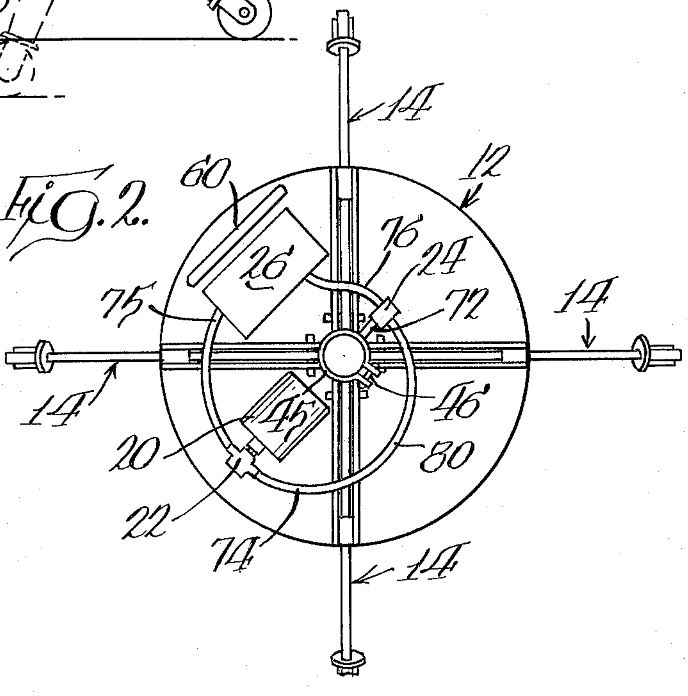
FIG. 2 is a top plan view of my lift with the top support rack removed.

In the drawings, and in particular FIGS. 1 and 2, is illustrated a preferred form of my invention wherein a lift 10 has a base plate 12 to which is pivoted support legs 14 and upon which base 12 is supported the hydraulically-actuated telescopic pillar 16 which supports at its top end a support rack 18. The pillar 16 is driven by fluid from a hydraulic system which includes a motor 20, a pump 22, a control valve 24 and a hydraulic reservoir 26.

Figure 4:
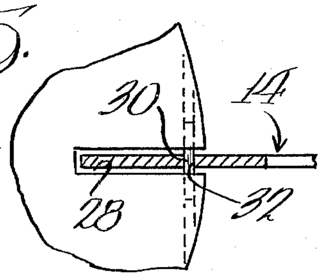
FIG. 4 is a partial broken away sectional view taken on the line 4—4 of FIG. 3.

The base plate 12 is shown substantially circular in shape and it must be heavy enough or reinforced enough to rigidly support the whole structure. Near the circumference of the base is formed four radially, inwardly projecting slots 28 (FIG. 4) across each one of which is fixed a pin 30 which passes through an opening 32 in the midportion of each leg 14. Each leg has an upper portion 34 disposed at an obtuse angle with respect to a lower portion 36. A caster wheel 38 is mounted to the outer end of each portion 36 of each leg and is adapted to roll freely upon a support surface. A conventional brake arrangement is provided for the wheels 38 so as to lock the wheels against rotation when the lift is in position prior to raising the support rack 18.

The upper portion 34 of each pair of diametrically opposite legs 14 have transversely extending guide pins 40 (FIGS. 5,6) extending through the outer extremities of each portion 34. Guide rods 42 are connected at one end to a U-shaped bracket 44 and are connected at the opposite end to a guide clamp 45. The guide clamp 45 encircles the pillar 16 and is clamped around the pillar or cylinder 16 at a fixed position after the leg guide rods are adjusted to the right location. The band clamp 45 is drawn tight to the cylinder by a bolt 46 acting between the ears of the clamp. There are four guide rods 42 for each leg 14 with two rods mounted to each side of each U-shaped bracket 44. The two rods 42 on each side are vertically spaced apart an amount slightly greater than the dimeter of the pins 40. The U-shaped bracket 44 bridges over the end of each leg when the legs are in the vertical or collapsed position. Since each bracket 44 is connected to the guide clamp 45 by means of the rods 42, it can be seen that movement either up or down of one bracket 44 and the associated rods 42 will move all of the brackets, the clamp 45, the rods and the pillar 16 up or down together with their associated legs 14.

Figure 5:
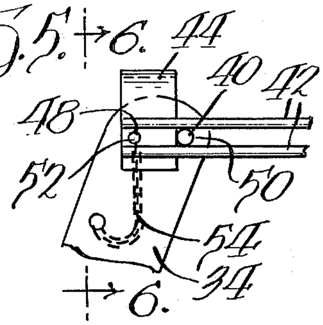
FIG. 5 is an enlarged, broken away elevational view of the connection between a leg and the leg stabilizing structure with the leg in the collapsed position.
Figure 6:
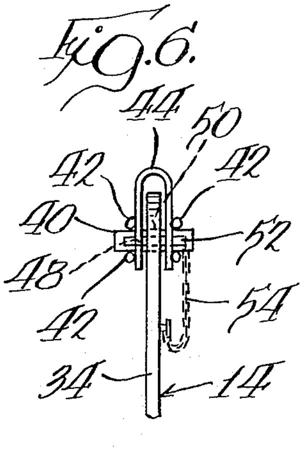
FIG. 6 is a partial sectional view taken on the line 6—6 of FIG. 5.

At least one bracket 44, see FIG. 5, has aligned apertures 48 through both sides thereof. The leg 14, associated with the bracket 44 having the apertures 48, has an aperture 50, see FIG. 6, through the outer portion 34 such that when the legs 14 are in the vertical or collapsed position, such as shown in phantom in FIG. 1, the apertures 48 align with the aperture 50 so that a locking pin 52 can be passed therethrough to lock the legs in said vertical position for storage or transport. The locking pin 52 is held captive to the leg 14 by means of a chain 54 which chain is welded or otherwise secured to said leg. Therefore, when the legs 14 are in the vertical or collapsed position, the pin 52 is passed through the apertures 48 in the bracket 44 and through aperture 50 in the end of the leg 14, so as to hold all of the legs 14 in the vertical or collapsed position thereby making it easier to move the lift mechanism from location-to-location for use and for storage. A U-shaped handle 60 is secured to the base 12 equidistant between two of the legs 14 so that the lift can be tilted or rocked on to the casters 38 of those two legs for more rapid and convenient transport of the lift from one location to another.

To set the lift arrangement in position ready for use, the pin 52 is pulled from the bracket 44 so that the legs 14 can be pivoted about the pivots 30 as the guide pins 40 ride between the rods 42 to move the clamp 45 and pillar or cylinder 16 from the phantom position of FIG. 1 to the solid line position of FIG. 1 with the clamp 45 engaging the top surface of the base 12 and with the lower half of the pillar 16 projecting below the base 12. The portion 36 of the legs will extend outwardly from the base thereby providing a relatively broad based support structure for the lift. That is, with the caster wheels 38 extending out a substantial distance from the base plate at four locations, substantial stability is afforded to the lift apparatus. The upper portions 34 of each leg 14 bears down on the top of the base such that the heavier the load on the lift, the greater the stabilizing force exerted by the legs and clamp 45 on the base.

Mounted on the bottom surface of the base plate 12 are four equally spaced brackets 60 each one of which supports an inwardly directed guide roller 62. In the central portion of the base 12, the telescoping, hydraulically-operated pillar 16 is movable up and down between said guide rollers 62 as said legs 14 are moved from the collapsed position, shown in phantom in FIG. 1, to the extended position, shown in solid lines in FIG. 1. With the pillar in the down position, a substantial length of said pillar extends below the base for stability during raising and lowering of the rack 18. The pillar 16 consists of a base section or cylinder 66 and two telescoping sections 68 and 70 with sections 68 and 70 being telescoped upwardly from within the base section 66. The base section 66 contains a conventional hydraulic cylinder of the type normally used for telescopic jack mechanisms. The hydraulic cylinder is connected by means of piping 72 to the directional-control valve 24 mounted by means of bracket 73 on the base section 66 of the pillar 16. Piping 74 connects the valve 24 to the pump 22 with piping 75 connecting the pump 22 to the reservoir 26. Piping 76 leads from the exhaust side of the valve 24 back to the reservoir 26. The hydraulic pump 22 is driven by the electric motor 20 with electric brake carried by the base 12. The directional-control valve 24 has a lever 78 which is used to shift the control valve from an "up" position for lifting the rack 18, to a "down" position for lowering through a "neutral" position. With the control valve 24 in the neutral position and the pump 22 running, fluid from the pump flows through piping 74 through the control valve 24 and through the piping 76 back to the reservoir. With the control valve in the up position, hydraulic fluid from the pump 22 flows through the piping 74 through the control valve 24 and through the piping 72 to the hydraulic cylinder for driving the sections 68 and 70 of the telescoping pillar into the extended condition. Setting the directional-control valve in the down position will permit the fluid in the hydraulic cylinder to flow from the hydraulic cylinder through the control valve 24 and back to the reservoir through piping 76.

Figure 7:
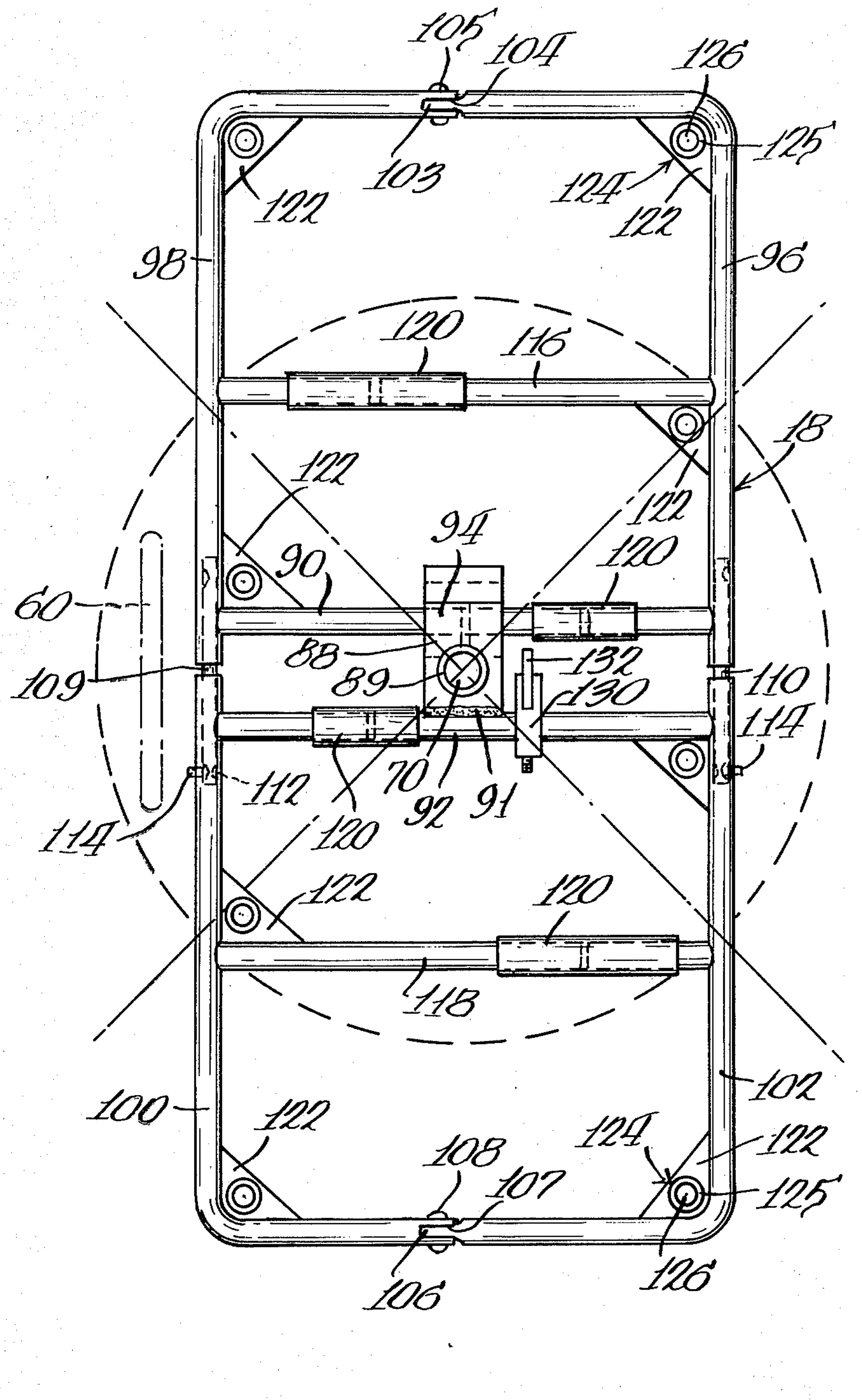
FIG. 7 is a plan view of the support rack showing the pressure switch in position.

As is shown in FIGS. 1 and 7, the support rack 18 is mounted to the upper end of the section 70 of the telescopic pillar 16 by means of the plate 88 and sleeve 89 rotatably mounted on the end of pillar section 70. The plate 88 is welded at 91 to a cross bar 92 and is connected to the cross bar 90 by means of a sliding clamp 94. The rack 18 has an outer, generally rectangular frame structure composed of four quarters or parts 96, 98, 100 and 102. Frame part 96 has a tongue 103 which is pivoted in a groove 104 in frame part 98 by means of a pin 105. Likewise, frame part 102 has a tongue 106 which is pivoted in a groove 107 in frame part 100 by means of a pin 108. Parts 96 and 98 are connected to parts 102 and 100, respectively, by means of rods 109 and 110 which are staked in parts 96, 98 and have extensions which slide into the mating end portions of the adjoining parts 100, 102. A groove 112 is formed in the outer surface of the extensions of each rod 109 and 110 near the one end thereof into which groove is urged the spring-urged snap lock bar 114. Each snap lock bar 114 passes through one of the side walls of the frame parts 100 and 102.

The cross bars 90, 92 and 116, 118 are connected between the parts 96 and 98 and between parts 102 and 100, respectively, with each cross bar having a break therein. Each break in each cross bar is bridged by an overlapping sleeve 120 which serves to hold the two parts of each cross bar together. In at least two of the corners of each part 96, 98, 100 and 102 and, in particular, between the cross bars and the frame parts, a reinforcing angle plate 122 is welded. Each angle plate 122 supports an upwardly facing roller arrangement 124. Each roller arrangement consists of a socket 125 and a ball 126 seated in the socket such that the ball is free to rotate relative to the socket.

When the lift is not needed, the support rack 18 can be collapsed by releasing the sliding clamp 94 and by actuating the snap locks 114 whereupon the parts 96 and 98 can be pulled from the connection with the parts 100 and 102 and out of the sliding clamp 94 on the plate 88. With the parts 96 and 98 removed, the sleeves 120 on cross bars 90 and 116 are slid out of overlapping relationship with the break in parts 90, 116 whereupon the parts 96 and 98 can be folded upon each other about the pin 105. The parts 100 and 102 are removed from the pillar 16 by lifting sleeve 89 off the end of the section 70 of the pillar after disconnecting the electric wire to a switch 130 on the bar 92. The part 100 can be folded onto the part 102 about the pin 108 after the sleeves 120 are slid out of overlapping relationship with the breaks in the bars 92 and 118. The folded parts 100, 102 and 96, 98 are stored on the base plate 12.

With the support rack 18 fully extended and in position on the pillar 16, the pressure switch 130 is mounted on the cross bar 92 with an actuator finger 132 projecting upwardly beyond the common plane lying tangent to the balls 126 of the roller arrangements 124 on the support rack. An electrical conduit 134 runs from the pressure switch 130 through holders 136 along the telescopic pillar 16 and to the controls on the motor 20. The electrical conduit 134 is of the expandable type so that as the pillar is raised or lowered, the conduit 134 will expand or retract as needed. With a sheet of panelling or wallboard 140 positioned on the rollers on the support rack 18, the finger 132 of the pressure switch 130 is partially deflected but is still in the operative position. Excess pressure on the wallboard against the ceiling will cause the wallboard to deflect the span of wallboard between the rollers sufficient to trip the switch 130 which will shut off the electric motor 20 thereby actuating the electric brake, deactivating the pump and stopping and further upward or downward movement to the hydraulic cylinder. The directional-control valve 24 is such that once the pressure switch 130 has been tripped, the valve 24 will not operate in the up position. The valve 24 can be moved to the down position which will override the power cut-off caused by tripping of the pressure switch 130 whereupon the hydraulic cylinder will retract the sections 68 and 70 of the pillar 16 to lower the rack 18.

As can be seen in FIG. 7, the base 12 is shown in phantom and has the four legs 14 extending in such a way as to provide the support outward of the elongate side edges of the support rack 18. The handle 60 is located on the base 12 outboard of the support rack so that there will be no interference between the support rack 18 and the handle when the support rack is in the lowermost position. It is possible to rotate the support rack 18 relative to the vertical axis of the pillar 16 but when it is desired to lower the support rack below the upper level of the handle 60, the support rack must be oriented relative to the handle so as not to interfere with the handle 60 as the support rack 18 is lowered. With a stack of panels 140 on the rack, an operator moves the lever 78 to the up position whereupon the rack and panels are raised by the telescopic pillar 16. The topmost panel is moved a few inches out of alignment with the rest of the stack so that when it is in position against the ceiling rafters, the valve is shut off and the carpenter can secure the two exposed edges of the panel to the rafters. The lift is then shifted on the casters, slightly, so that the other edges of the panel can be secured to the rafters.

In the event the valve 24 is not shut off in time, the panels will be deflected by the pressure against the rafters whereupon the switch 130 is tripped, the electric brake motor and pump are shut off and no further upward pressure is brought to bear on the panels. Movement of the lever 78 on the valve to the down position will override the cut off switch and will lower the pillar, rack and panels.

I claim:

1. A lift for raising panels of material comprising a base, at least three legs pivoted on said base and extending outwardly into a stable supporting position, a telescoping pillar movably mounted through said base and projecting upwardly therefrom, means for supporting said pillar on said base, means for elongating said pillar, a support rack positioned on said pillar and extending transverse to the axis of said pillar, and control means on said support rack for deactivating said elongating means when excessive pressure urges said panels against an obstruction.

2. A lift as claimed in claim 1 wherein said base has four legs which are pivoted from the extended position to a retracted position and means are provided on said legs for holding said legs in said retracted position.

3. A lift for raising panels of material comprising a base, four legs are pivoted on said base and extend outwardly into a stable supporting position, said legs are pivoted from the extended position to a retracted position and means are provided on said legs for holding said legs in said retracted position, a telescoping pillar movably mounted through said base and projecting upwardly therefrom, means for supporting said pillar on said base, means for elongating said pillar, a support rack positioned on said pillar and extending transverse to the axis of said pillar, control means on said support rack for deactivating said elongating means when excessive pressure urges said panels against an obstruction, said control means comprises a band clamp secured in position on said pillar, pairs of guide rods secured to said band clamp and extending radially into sliding contact with the opposite sides of a pin on the end portions of each leg, a bracket secured to the outer ends of each pair of guide rods and means for locking one of said brackets to one of said legs for holding said legs in the retracted position.

4. A lift for raising panels of material comprising a base, at least three legs pivoted on said base and extending outwardly into a stable supporting position, a telescoping pillar movably mounted through said base and projecting upwardly therefrom, means for supporting said pillar on said base, means for elongating said pillar, a support rack positioned on said pillar and extending transverse to the axis of said pillar, control means on said support rack for deactivating said elongating means when excessive pressure urges said panels against an obstruction, said support rack has means for collapsing said rack for storage, said means comprising snap lock connectors for releasably holding two halves of the rack assembled, pivot hinge means between two parts of each half, and sleeve means encircling cross bars extending between the two parts of each half and overlapping a break in each cross bar so that movement of said sleeve means from the break will permit the two parts of each half to be folded together.

5. In a lift for raising panels of material having a base, legs mounted on said base, telescoping means guided through and carried by said base and being vertically extendable, and a support rack mounted on said telescoping means, in combination with, a motor mounted on said base, a hydraulic pump on said base driven by said motor, a control valve carried by said telescoping means and connected to said pump, a reservoir on said base connected to said pump and to said control valve, a hydraulic cylinder on said telescoping means and connected to said control valve whereby actuation of the control valve in one direction circulates hydraulic fluid under pressure from the pump to the hydraulic cylinder for raising said telescoping means, and actuation of the control valve in another direction passes the hydraulic fluid from the hydraulic cylinder to the reservoir to lower the telescoping means.

6. In a lift as claimed in claim 5 wherein a pressure switch is mounted on said support rack in engagement with a panel being raised by said lift, and means for electrically connecting said switch to said motor, said switch being tripped upon excessive deflection of said panel caused by excessive force of said lift against a ceiling whereby said motor will be deactivated and the telescoping means will not be further extended.

7. In a lift as claimed in claim 5 wherein said support rack has means for collapsing said rack for storage, said means comprising snap lock connectors for releasably holding two halves of the rack assembled, pivot hinge means between two parts of each half, and sleeve means encircling cross bars extending between the two parts of each half and overlapping a break in each cross bar so that movement of said sleeve means from the break will permit the two parts of each half to be folded together.

8. A lift for raising panels comprising a base, four legs carried by said base and being pivoted from an extended support position to a retracted transport position, a three-section telescoping pillar movably mounted through the midportion of said base and projecting upwardly therefrom, clamp means on said pillar in engagement with said base to support said pillar on said base, hydraulic means for elongating or retracting said telescoping pillar, a collapsible support rack removably positioned on said pillar and extending transverse to the axis of said pillar, and control means on said support rack for deactivating the elongation of said hydraulic means when said panels are urged with excessive pressure against an obstruction such as the rafters of a ceiling.

* * * * *